United States Patent [19]

Duncan et al.

[11] 4,075,454
[45] Feb. 21, 1978

[54] PROCESS AND APPARATUS FOR SEALING NUCLEAR REACTOR FUEL

[75] Inventors: Robert Duncan; Richard P. Barna, both of Columbia, S.C.

[73] Assignee: Westinghouse Electric Corporation, Pittsburgh, Pa.

[21] Appl. No.: 612,112

[22] Filed: Sept. 10, 1975

Related U.S. Application Data

[63] Continuation of Ser. No. 399,767, Sept. 20, 1973, abandoned.

[51] Int. Cl.² .............................................. B23K 9/00
[52] U.S. Cl. .............................. 219/137 R; 219/60 A
[58] Field of Search ............ 219/137 R, 74, 75, 60 R, 219/60 A, 121 P, 121 EM, 121 EB; 176/66–77, 79; 29/428

[56] References Cited

U.S. PATENT DOCUMENTS

| 3,683,148 | 8/1972 | Boyko et al. ................... 219/137 R |
| 3,725,635 | 4/1973 | Fink et al. ...................... 219/121 P |
| 3,835,291 | 9/1974 | Sciaky ............................ 219/121 EB |

FOREIGN PATENT DOCUMENTS

| 1,198,565 | 7/1970 | United Kingdom .................. 176/79 |

*Primary Examiner*—Bruce A. Reynolds
*Assistant Examiner*—Fred E. Bell
*Attorney, Agent, or Firm*—J. R. Campbell; Z. L. Dermer

[57] ABSTRACT

Process and apparatus for simultaneously pressurizing a fuel rod having a plug in one end, welding a plug in the other end and sealing a gas pressurizing orifice therein in a single operation. A weld chamber is provided which accommodates one end of a seal rod having a plug fixed in the rod end by a friction fit. A mechanism pushes the fuel rod into the weld chamber which is then pressurized to force gas through a plug orifice into the fuel rod. During subsequent rotation of the rod, an electrode in the weld chamber forms a weld puddle which bridges the end plug-fuel rod interface and the plug orifice to thereby weld the plug in the rod and seal the plug orifice in a single operation.

6 Claims, 3 Drawing Figures

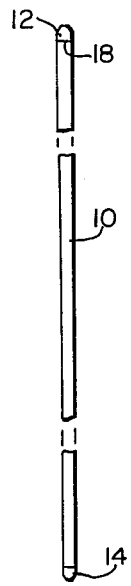
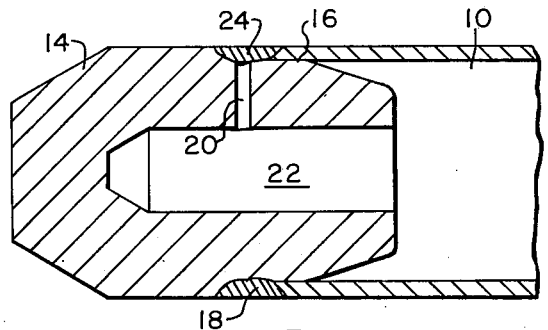
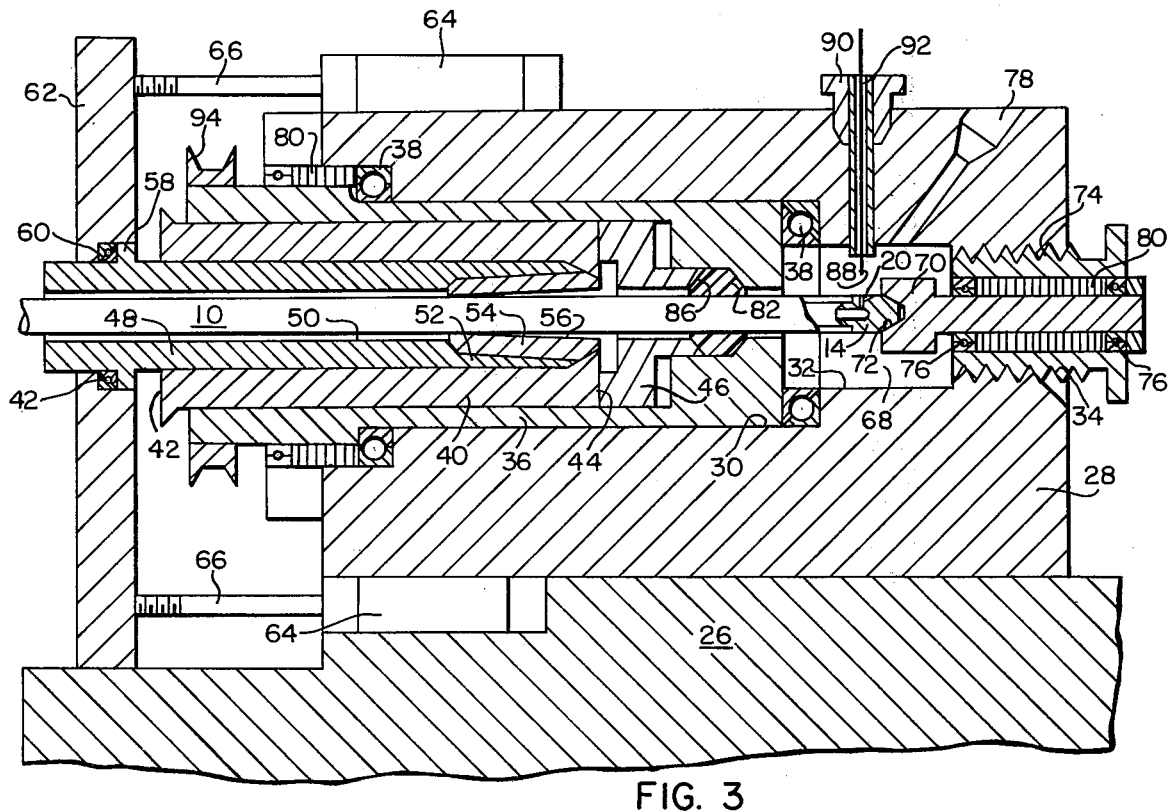

PROCESS AND APPARATUS FOR SEALING NUCLEAR REACTOR FUEL

This is a continuation of application Ser. No. 399,767, filed Sept. 20, 1973 now abandoned.

BACKGROUND OF THE INVENTION

Conventionally, in manufacturing fuel rods of the type used in nuclear reactors, hollow stainless steel, zircaloy or other material tubing is filled with cylindrical fuel pellets and capped on both ends with plugs which temporarily are attached to the tubing by a force fit. These plugs are then permanently sealed in position with a tungsten inert weld by rotating the tubing relative to an electrode which forms a girth weld at the tubing-plug interface. Since the tubing is charged with high pressure helium through an orifice in one end plug, a second welding operation is then carried out to seal the plug orifice.

This second operation of sealing the orifice is a costly process since a special weld chamber sufficiently strong to accommodate high pressure gas and of gas tight integrity is necessary to contain the pressurization gas without leakage. Further, in addition to requiring a separate welding machine and operation, the orifice weld must be inspected by X-ray techniques to assure that gas charged in the fuel rod will not thereafter leak when the fuel rod undergoes a fission process in a nuclear reactor.

SUMMARY OF THE INVENTION

Briefly stated, the above disadvantages are eliminated by the present invention by providing improved pressurization-seal weld structure which applies weld material to the hollow tubing-plug interface to form the girth weld while simultaneously pressurizing the rod with gas and sealing the orifice which was used for permitting ingress of gas into the fuel rod for pressurization purposes.

BRIEF DESCRIPTION OF THE DRAWINGS

The subject matter of the invention is particularly pointed out and distinctly claimed in the concluding portion of this specification. The invention however both as to organization and method of operation, together with further objects and advantages thereof, may best be understood by reference to the following description taken in connection with the accompanying drawing, in which:

FIG. 1 is a view in elevation of a fuel rod;

FIG. 2 is an enlarged sectional view in elevation of one end of the fuel rod of FIG. 1 showing the relative disposition of the end of the fuel rod and a plug welded in the end thereof; and FIG. 3 is a view in elevation, partly in section, of apparatus used to simultaneously pressurize the fuel rod and seal a plug and plug orifice in the end of the tube.

BRIEF DESCRIPTION OF THE PREFERRED EMBODIMENTS

Referring now to the drawing wherein like reference characters designate like or corresponding parts throughout the several views, there is shown in FIGS. 1 and 2 a stainless steel, zircaloy or other type of fuel rod 10 having end plugs 12 and 14 secured in opposite ends thereof. Each of plugs 12 and 14 have the same external diameter as the fuel rod and are equipped with a reduced portion 16 of substantially the same size as the internal diameter of the rod. The complementary diameters of the plug and tube permit plug insertion in the fuel rod opposite ends with a friction fit thus providing a firm anchor for the plugs when a subsequent welding operation takes place. The plug 12 is sealed in the fuel rod by a conventional girth weld in accordance with well known practices.

Plug 14 however additionally includes a gas inlet orifice 20 which leads into a central machined out area 22 having direct communication with the inside of the fuel rod. With plug 14 frictionally disposed in the rod end and the rod placed in a gas tight chamber, a girth weld 24 is applied circumferentially around the rod end in the area where the plug interfaces with the rod to seal the plug in the rod and simultaneously close the orifice opening 20, all as more fully described hereafter.

The weld or gas chamber 68 illustrated in FIG. 3 is designed to accomplish the simultaneous pressurization of the fuel rod, welding of plug 14 in the rod and the sealing of orifice 20 in the end plug. The mechanism shown rests on base 26 which supports either a square or cylindrical housing 28 having a machined bore 30 which merges into a smaller bore 32 and an internally threaded section 34. Rotatable sleeve 36 having an outer diameter complementary to bore 30 fits in the bore and is arranged for rotation therein on a pair of bearings 38. A push rod 40 positioned in rotatable sleeve 36 is provided with enlarged end faces 42 and 44, the face 44 being arranged to selectively engage ram 46 located in the end of sleeve 36. Collet holder 48 also has a bore 50 which merges into a conical opening formed by diverging walls 52. A collet 54 equipped with an axial opening 56 is positioned within the collet holder conical walls 52, the diameters being such that the fuel rod 10 may be inserted through the central openings in the collet holder, collet and ram 46 in the manner shown in FIG. 3. Rotatable sleeve 36 is keyed to push rod 40 and ram 46 which permits rotation of these elements as a single entity.

As shown on the left side of FIG. 3, the collet holder 48 is provided with a radially extending flange 58 which bears against thrust bearing 60 positioned in a backing plate 62. Pneumatic or hydraulic cylinders 64 each having a reciprocating piston therein are connected to backing plate 62 through connecting rods 66, the arrangement being such that as the pistons in the pneumatic or hydraulic cylinders are moved to the right as shown in FIG. 3, the backing plate 62 engages flange surfaces 42 on the collet holder which forces the collet holder to the right to cause the collet 54 to capture the fuel rod 10 and thus hold it in an immovable position.

As shown on the right side of FIG. 3, the gas or weld chamber 68 is formed in the cylindrical housing 28 and located within the housing is a fuel rod stop member 70 having a cavity 72 in its outer end which is complementary to the plug 14 which is frictionally held by the fuel rod 10. The stop member 70 is rotatably mounted in a plug 74 screw threaded into the holder 28 and bearings 76 accommodate such rotation.

The gas chamber 68 is charged with helium or other gas through inlet 78 and at a pressure which corresponds with the pressure desired in the fuel rod 10. According to conventional practice, the fuel rods for large nuclear reactors normally are charged to a pressure of approximately 450 psi and that pressure will therefore prevail in the gas chamber 68. It is to be understood that other pressures may be used depending on the degree of gas pressure desired in the fuel rod. To prevent leakage of gas from the gas chamber 68, ferrofluidic seals 80 located between the bearings 76, and between the rotatable sleeve 36 and housing 28, prevents the high pressure gas in the gas chamber from escaping through bearings 76 and 38 to the atmosphere. To preclude leakage from the gas chamber along the outer surface of the fuel rod 10, a urethane seal 82 having a central opening therein is positioned in the sleeve 36 and one end 86 of ram 46 also is designed to contact the deformable urethane member 82.

All of the parts are arranged such that when the fuel rod 10 is pushed into weld chamber 68 where plug 14 engages the stop member complementary surfaces 72, the interface of the end of fuel rod 10 and plug 14, and the orifice 20 in the plug, lies directly beneath an electrode 88 which is immovably held in support holder 28 by a plug 90. To obtain welding of plug 14 in the fuel rod, and the orifice, the fuel rod is rotated relative to the stationary electrode 88 and when electric power is supplied to the electrode, an arc is formed and a weld puddle then bridges the circumferential line formed at point of junction of the fuel rod and plug 14 and the gas orifice formed in the plug. The electrode is insulated from the chamber by a Telfon insert 92 which is crimped tightly against the electrode to prevent high pressure gas from escaping from the gas chamber to the atmosphere.

To secure rotation of the fuel rod in the gas chamber 68 a pulley 94 driven through a motorized belt drive, not shown, is immovably mounted on the sleeve 36. As indicated above, sleeve 36, push rod 40 and ram 46 are all keyed together to operate as a separate entity. Also, the tight fit of collet holder 48 and collet 54 to push rod 40 insures the rotation of fuel rod 10 when the pulley 94 rotates the parts.

OPERATION

In operation, the fuel rod 10 is manually pushed into the bore provided in the collet holder 48, collet 54 and urethane seal 82 until the end of the fuel rod plug 14 engages the stop member surfaces 72. These elements including the stop 70 serve as a support for the fuel rod during the time it is rotated during the welding process. With the fuel rod firmly in place, the pistons in pneumatic or hydraulic cylinder 64 are moved to the right thus causing the backing plate 62 to move to the right and engage the surfaces 42 of push rod 40. As these parts move to the right, the surface 44 of the push rod engages ram 46 and the collet holder 48 is moved towards the gas chamber. The push rod acts against ram 46 and as the ram moves forwardly, the collet 54 and urethane seal 82 are deformed and tightly grasp the fuel rod to hold it stationary and to eliminate the possibility of high pressure gas escaping from the gas chamber and around the fuel rod 10 to the atmosphere. The ferrofluidic seals 80 prevents the high pressure gas from escaping through the bearings while the Telfon seal 92 precludes escape of gas past the electrode to the atmosphere. With the fuel rod 10 firmly set in a precise position beneath the electrode within the gas chamber and with the seals in place to prevent gas leakage therefrom, helium or other gases are introduced through the gas inlet 78 into the chamber to flow through plug orifice 20 and thus charge the fuel rod to the desired pressure. The gas supply may remain connected to the gas chamber or the inlet may be sealed off by appropriate means to trap the gas therein. It will be understood that at this time, the fuel rod is loaded with enriched uranium or other fuel pellets and the gas which enters the fuel rod 10 fills any void spaces around the fuel pellets and a small void area which usually is maintained near the end of the fuel rod. With the gas held in the gas chamber at approximately 450 psi, the inlet usually is then closed thus trapping the gas therein. At the appropriate time, the motor used for driving the pulley 94 is energized to cause rotation of the rotatable sleeve 36, push rod 40, collet holder 48, ram 46 and the fuel rod 10. As the fuel rod is rotated, energy applied to the electrode forms a weld puddle which extends over a circumferential line at the fuel rod-plug interface and the plug orifice thus metallurgically bonding the plug to the rod and simultaneously sealing the plug orifice 20. The welding operation performed in this high pressure gas environment assures that the fuel rod will be charged to the proper pressure and the pressure locked therein at the time the welding operation is completed. Also, by maintaining the 450 psi or other pressure in the gas chamber, there is no possibility for gas in the fuel rod to force plug 14 out of the fuel rod during welding because gas pressures in the fuel rod and gas chamber are equalized.

It will be apparent that many modifications and variations are possible in light of the above teachings. It therefore is to be understood that within the scope of the appended claims, the invention may be practiced other than as specifically described.

What is claimed is:

1. Apparatus for pressurizing a fuel rod and sealing a plug in an end thereof comprising:
    a base supporting a housing having a gas chamber and rotatable members therein;
    a fuel rod adapted to be held by said rotatable members, said fuel rod having a closed end positioned outside said housing and a plug frictionally held in the other end, a radially extending orifice in said plug which communicates with the interior of said fuel rod;
    a gas chamber in said housing positioned adjacent said rotatable members, said chamber having a fuel rod stop member therein and being constructed and arranged to receive said plug end of the fuel rod;
    a gas inlet to said gas chamber so that gas introduced thereinto flows through the plug orifice to pressurize said fuel rod;
    actuating means on said housing including a hydraulically actuated ram connected to said rotatable members which causes said rotatable members to firmly grasp the fuel rod and simultaneously effect sealing of the plug end of said fuel rod in the gas chamber;
    drive means connected with said rotatable members for rotating said fuel rod at a predetermined speed; and
    an electrode in said gas chamber for simultaneously sealing said orifice in the end plug and said plug in the fuel rod when the fuel rod is rotated by said rotatable members.

2. Apparatus according to claim 1 wherein a deformable member surrounds said fuel rod; and
    said actuating means includes a device which causes said deformable member to tightly grasp said fuel rod and rotate with said fuel rod when the rod is rotated by the drive means to thereby effect said sealing and preclude leakage of gas from the cylinder.

3. Apparatus according to claim 2 wherein a stop member is positioned in said gas chamber for precisely locating the abutting ends of the fuel rod and plug with respect to said electrode; and wherein a seal surrounds said stop member to preclude leakage of gas from said cylinder past said stop member.

4. Apparatus according to claim 1 wherein the actuating means on said housing comprises a hydraulically actuated ram connected to said rotatable members; and
said rotatable members include a collet holder and a collet positioned adjacent an end thereof, each of said collet holder and collet having a central opening therein through which said fuel rod extends;
whereby upon actuation of said ram, the collet holder is moved forwardly toward said gas chamber and causes the collet to firmly grasp said fuel rod and rotate as a single unit when the drive means is made operative.

5. Apparatus according to claim 1 wherein the actuating means on said housing comprises a hydraulically actuated ram connected to said rotatable members through which the fuel rod extends;
a push rod concentrically disposed on said rotatable members, one end of said push rod being positioned for engagement by said ram and the other end with a deformable seal surrounding a portion of the plug end of said fuel rod;
means holding said seal in the housing;
whereby upon actuation of said ram, the push rod is moved forwardly to engage said seal and cause it to conform to the fuel rod and housing and thereby preclude escape of gas from said gas chamber.

6. A method of pressurizing and sealing end plugs in a fuel rod comprising the steps of:
inserting plugs in opposite ends of a fuel rod having fissionable fuel therein, one of said plugs having a radial orifice therein which communicates with the interior of the fuel rod;
sealing one of said plugs in said rod;
slidably inserting the other end of said fuel rod in fuel rod rotatable members mounted in a housing having a gas chamber therein;
advancing said other end of the fuel rod through said rotatable members into said gas chamber and against a stop member therein and into a position where the abutting ends of the fuel rod and plug having the radial orifice lie adjacent a radially disposed electrode in the gas chamber;
actuating said rotatable members to grasp said fuel rod to cause said fuel rod to rotate therewith, and simultaneously causing a deformable seal adjacent said gas chamber to conform to the fuel rod surface and seal said other end of the fuel rod in said gas chamber thereby precluding leakage of gas from said chamber past said fuel rod to the atmosphere;
introducing gas into said chamber and flowing the gas through said orifice into the fuel rod for charging it to the same pressure as that remaining in the gas chamber;
rotating said fuel rod and deformable seal as a single unit; and
energizing said electrode to form a girth weld at the abutting ends of the fuel rod and plug and simultaneously seal said orifice in the same welding operation to thereby provide a sealed fuel rod having a pressurized gas therein.

* * * * *